US007742626B2

(12) United States Patent
Kamata et al.

(10) Patent No.: US 7,742,626 B2
(45) Date of Patent: Jun. 22, 2010

(54) BIOMETRICS SYSTEM AND BIOMETRICS METHOD

(75) Inventors: Hideo Kamata, Inagi (JP); Hiroyuki Tanaka, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 887 days.

(21) Appl. No.: 11/418,368

(22) Filed: May 5, 2006

(65) Prior Publication Data
US 2007/0098223 A1    May 3, 2007

(30) Foreign Application Priority Data
Oct. 27, 2005    (JP) .............................. 2005-313092

(51) Int. Cl.
*G06K 9/00* (2006.01)
(52) U.S. Cl. ..................................... 382/115
(58) Field of Classification Search .................. 382/115
See application file for complete search history.

(56) References Cited

U.S. PATENT DOCUMENTS

| 5,054,090 | A | * | 10/1991 | Knight et al. ............... 382/127 |
| 2001/0026632 | A1 | | 10/2001 | Tamai |
| 2002/0009213 | A1 | * | 1/2002 | Rowe et al. ................. 382/115 |
| 2004/0022421 | A1 | | 2/2004 | Endoh et al. |
| 2005/0047632 | A1 | | 3/2005 | Miura et al. |
| 2005/0148876 | A1 | * | 7/2005 | Endoh et al. ............... 600/454 |
| 2006/0023919 | A1 | * | 2/2006 | Okamura et al. ............ 382/115 |

FOREIGN PATENT DOCUMENTS

| DE | 44 21 237 A1 | 12/1994 |
| EP | 1 139 301 A2 | 10/2001 |
| EP | 1 385 116 A1 | 1/2004 |
| JP | 2001-273948 | 10/2001 |
| JP | 2004-62826 | 2/2004 |
| WO | WO 03/007215 A1 | 1/2003 |
| WO | WO 2004/021884 A1 | 3/2004 |

OTHER PUBLICATIONS

American Banker New York NY, Aug. 1997 vol. 162 Iss 148 p. 28.*
Extended European Search Report with Annex dated Jul. 17, 2007, issued in corresponding European Application No. 06252422.

* cited by examiner

*Primary Examiner*—Wesley Tucker
*Assistant Examiner*—Mark Roz
(74) *Attorney, Agent, or Firm*—Westerman, Hattori, Daniels & Adrian, LLP

(57) ABSTRACT

A biometrics authentication system that performs individual authentication in use of biometrics information facilitates authentication operation and reduces authentication errors. A storage unit stores therein the shape of the body part of the user, of which is captured at the time of registration of biometrics data, and a display unit displays the body part shape from the time of registration when authenticating the user for directly identifying the state of image capture of the body part at the time of registration and for guiding into a state of image capture of the body part similar to the state at the time of registration. The body part can be guided effectively such that the circumstances of body part image capture at the time of authentication and at the time of registration are in agreement, for improved verification efficiency.

18 Claims, 14 Drawing Sheets

FIG. 7
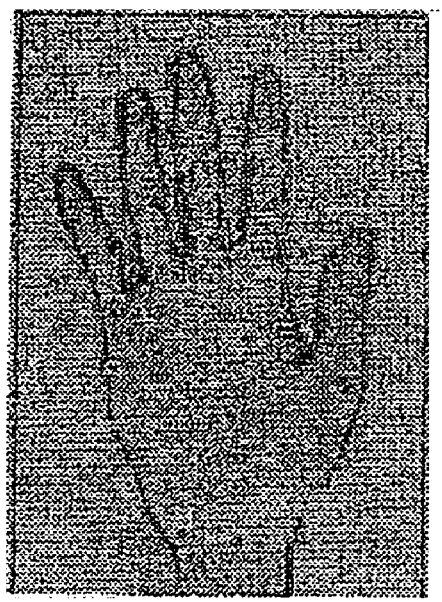
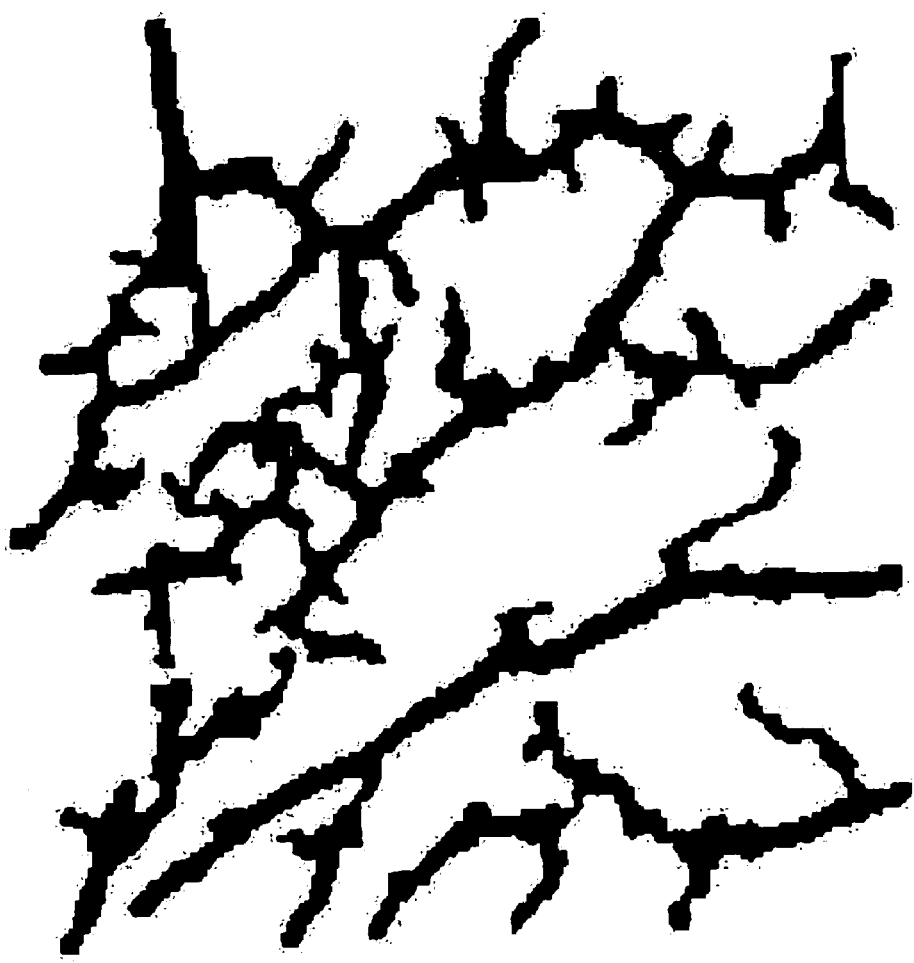
FIG. 8

BIOMETRICS SYSTEM AND BIOMETRICS METHOD

CROSS-REFERENCE TO RELATED APPLICATIONS

This application is based upon and claims the benefit of priority from the prior Japanese Patent Application No. 2005-313092, filed on Oct. 27, 2005, the entire contents of which are incorporated herein by reference.

BACKGROUND OF THE INVENTION

1. Field of the Invention

The present invention relates to a biometrics system and biometrics method utilizing characteristics of a portion of the human body to perform individual authentication, and in particular relates to a biometrics system and biometrics method which guide a body part into a state of registration when detecting biometrics information for use in verification against registered biometrics information.

2. Description of the Related Art

There exist numerous portions of the human body, such as fingerprints and toeprints, the retinas of the eyes, facial features, and blood vessels, which can be used to discriminate individuals. Advances in biometrics technology in recent years have been accompanied by the appearance of various devices to recognize the characteristics of such portions of human bodies and perform individual authentication.

Methods of individual authentication through biometrics have been provided which utilize facial features, the iris of the eye, blood vessels in the palm and fingers, finger prints and palm-prints, and similar. These methods have been used in various fields as individual authentication methods affording a high level of security.

For example, comparatively large amounts of individual characteristic information are obtained from blood vessels in the palm and back of the hand, and blood vessel (vein) patterns remain unchanged throughout life from infancy and are regarded as being completely unique, and so are well-suited to individual authentication. Such individual authentication methods are here explained. At the time of registration or of authentication the user brings his palm into proximity with an image capture device. The image capture device emits near-infrared rays, which are incident on the palm of the hand. The image capture device uses a sensor to capture near-infrared rays rebounding from the palm of the hand.

Hemoglobin in the red corpuscles flowing in the veins has lost oxygen. This hemoglobin (reduced hemoglobin) absorbs near-infrared rays. Consequently when near-infrared rays are made incident on the palm of a hand, reflection is reduced only in the areas in which there are veins, and the intensity of the reflected near-infrared rays can be used to identify the positions of veins.

At the time of biometrics registration, a user first utilizes an image capture device to register vein image data for the palm of his own hand on a server and on a card. Then, in order to perform individual authentication, the user utilizes an image capture device to cause reading of vein image data for his own palm. The registered vein image retrieved using the user's ID is verified against the vein pattern of the vein verification image thus read to perform individual authentication (see for example Japanese Patent Laid-open No. 2004-062826).

In such biometrics information detection, the body part can be moved freely with respect to the image capture device, and in particular, the hand, face, and fingers can be moved freely. On the other hand, it is necessary for precise verification that the body part for detection be positioned within the range of image capture of the image capture device. As such a method, a method for detecting, at the time of authentication, the position and orientation of the hand upon each image capture, and using a display or voice output to notify the user that the hand position or orientation is inappropriate (see for example WO 04/021884), and a method of displaying a hand shape or other standard shape-pattern, and for guiding the user in the mode of image capture, have been proposed (see for example WO 04/021884 (FIG. 3) and Japanese Patent Laid-open No. 2001-273948).

Methods which include the shape of the hand in verification based on blood vessel images have also been proposed. That is, methods have been proposed in which, at the time of registration the shape of the hand is also registered in advance, and at the time of verification a judgment is made as to whether the shape of the hand for which an image is captured is similar to the shape of the hand at the time of registration, and if the degree of similarity is low, blood vessel image verification is not performed, but if the degree of similarity is high, blood vessel image verification is performed (see for example WO04/021884).

In the former technology of the prior art, a standard shape is displayed, and the user is guided to an appropriate image capture mode; or, an image of detection of the body part is used in analysis to determine whether the detected body part is in the appropriate image capture range, and guidance is provided. However, when such guidance is performed, if the circumstances of body part detection at the time of registration differ from the circumstances of body part image capture at the time of authentication despite this guidance into the image capture range, satisfactory verification results cannot be obtained.

Examples in which the circumstances of image capture of a body part are different during registration and during authentication include, for example, in the case of authentication using the palm of the hand, a degree of difference in the spreading of the fingers at the time of registration and at the time of authentication; and in the case of authentication using facial features, different orientations of the face, or the presence and absence of glasses, at the time of registration and at the time of authentication. Thus even when the position and orientation of the hand or face are similar, often the verification results fail to match.

In the latter technology of the prior art, the shape of a hand is used together with an authentication algorithm, so that when there is authentication failure, the user does not directly understand the cause, and often it is not possible to determine how the body part should be guided with respect to the image capture device. In particular, persons with little experience with the device, and elderly and other persons, will tend to experience inconvenience.

In general, the user does not remember the state of image capture of the body part at the time of registration, and moreover the user will have a strong aversion to being forced into a strictly defined state (position or similar) of the body part for image capture at the time of registration. Consequently from the standpoint of the device manufacturer, because there are cases in which unanticipated events occur and verification errors may arise, it is expected that in such cases, if the user, if the individual in question, will lose confidence in such biometrics authentication. Particularly when used in automated equipment (automated cash transaction machines, automated vending machines, in entrance doors to dwellings, and similar), because dedicated personnel are not on site, trouble is incurred in determining the cause of the problem, giving rise to a further loss of confidence in biometrics authentication.

SUMMARY OF THE INVENTION

Hence one object of this invention is to provide a biometrics system and biometrics method to effectively guide a body part at the time of authentication so as to coincide with the body part image capture circumstances at the time of registration, in order to improve verification efficiency.

A further object of this invention is to provide a biometrics system and biometrics method to guide a body part to the circumstances of body part image capture at the time of registration without placing a burden on the user, and to shorten the time required for verification.

Still a further object of this invention is, at the time of a verification error, to guide the body part to the circumstances of body part image capture at the time of registration without causing confusion on the part of the user, in order to effect convenience of use of biometric authentication for the user.

In order to attain these objects, a biometrics system of this invention, which verifies characteristic data of body parts registered in a storage unit against characteristic data of body parts obtained through image capture to perform individual authentication, has an image capture device which captures images of the body parts in a contact-free manner; a control device which extracts characteristic data of the body parts from the captured images of body parts and verifies the results against the registered characteristic data to perform individual authentication; and a display device, which, at the time of individual authentication, displays the shape of the body part obtained from image capture at the time of registration of the body part characteristic data stored in the storage unit.

Further, a biometrics method of this invention for verifying body part characteristic data registered in a storage unit against body part characteristic data obtained by image capture to perform individual authentication, has an image capture step of capturing an image, in a contact-free manner, of the body part by an image capture device; a step of extracting characteristic data of the body part from the captured image of the body part; an authentication step of verifying the extracted characteristic data of the body part against the registered characteristic data; and a display step, at the time of individual authentication, of displaying on a display device the shape of the body part obtained through image capture at the time of registration of the characteristic data of the body part stored in the storage unit.

In this invention, it is preferable that the control device display on the display device the shape of the body part at the time of verification, obtained in image capture by the image capture device, together with the shape of the body part at the time of registration.

In this invention, it is preferable that the storage unit store, at the time of registration of the body part characteristic data, shape data of the body part obtained in image capture of the body part and characteristic data of the body part, and the control device read, at the time of the biometric authentication, the shape data of the body part and the characteristic data of the body part from the storage unit.

In this invention, it is preferable that the biometrics system further have a biometrics data registration device, which captures an image of the body part, extracts shape data of the body part and characteristic data of the body part from the captured image, and stores the data in the storage unit.

In this invention, it is preferable that the biometrics system further have an input unit for inputting an identification number, in order to retrieve, from the storage unit, shape data of the body part of the user for whom individual authentication is to be performed.

In this invention, it is preferable that the input unit be a portable unit possessed by the user.

In this invention, it is preferable that the storage unit be provided in a higher-level device connected to the control device.

In this invention, it is preferable that the storage unit be provided in a portable unit possessed by the user.

In this invention, it is preferable that the storage unit has a higher-level device which is connected to the control device and stores shape data of the body part, and a portable unit which is possessed by the user and stores characteristic data of the body part.

In this invention, it is preferable that the biometrics system have a communication unit by means of which, at the time of individual authentication, the user calls a call center, and a terminal device which reads the shape of the body part of the user from the storage unit, displays the body part shape on the display of the call center, and provides guidance to the user.

In this invention, it is preferable that the image capture device has an image capture unit which captures images of at least a portion of a hand of the user, and that the control device extract blood vessel image data of the portion of the hand from the captured image.

In this invention, it is preferable that the portable unit verify the body part characteristic data, extracted by the portable unit from the captured image of the body part, against characteristic data registered in the storage unit, and performs individual authentication.

In this invention, the captured image for authentication is registered in advance at the time of biometric registration, and at the time of biometric authentication the captured image is displayed and provided to the user for use in image capture; hence convenience to the user is increased, with advantages for operation by a user not familiar with the authentication system and for improving the speed of authentication.

BRIEF DESCRIPTION OF THE DRAWINGS

FIG. 7 explains the registered body part shape of FIG. 5;

FIG. 8 explains the blood vessel image of FIG. 5;

DESCRIPTION OF THE PREFERRD EMBODIMENTS

Below, embodiments of the invention are explained in the order of a first embodiment of a biometrics system, configuration of biometrics authentication processing, biometrics registration processing, biometrics authentication processing, other biometrics authentication processing, second embodiment of a biometrics system, third embodiment of a biometrics system, fourth embodiment of a biometrics system, and other embodiments.

First Embodiment of a Biometrics System

Figure 1:
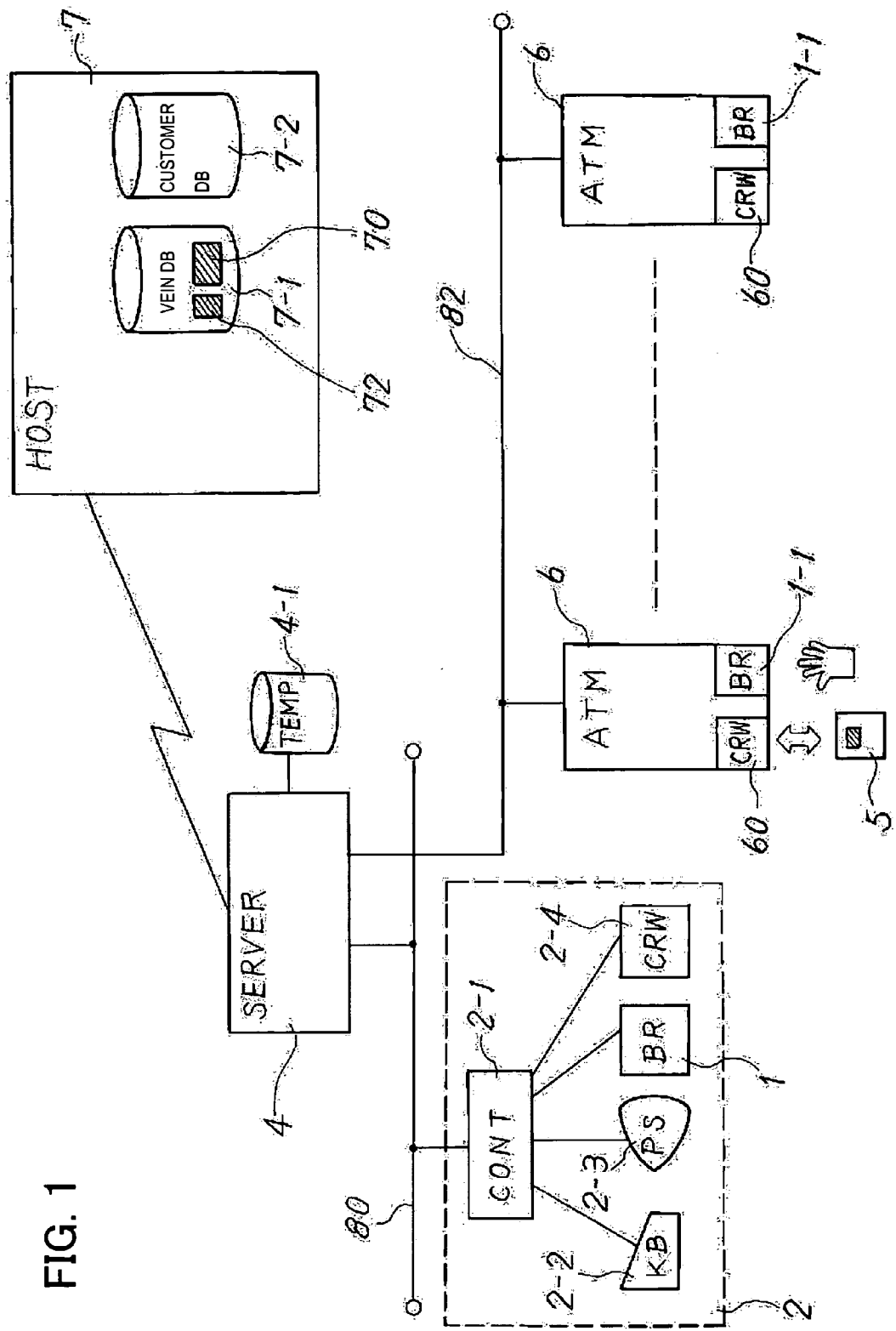
FIG. 1 shows the configuration of the biometrics system of a first embodiment of the invention.
Figure 2:
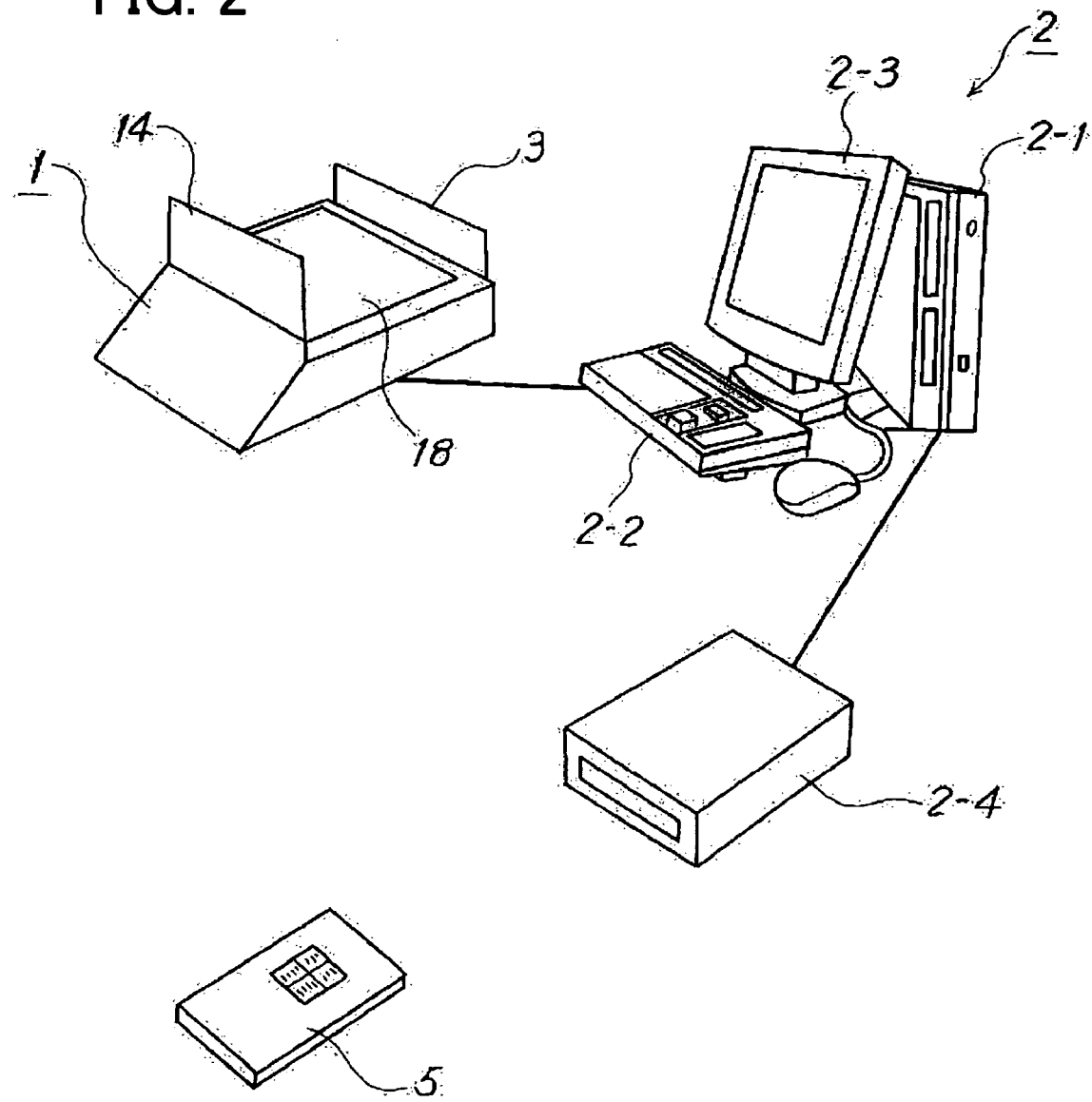
FIG. 2 shows the configuration of the service area terminal of FIG. 1.
Figure 3:
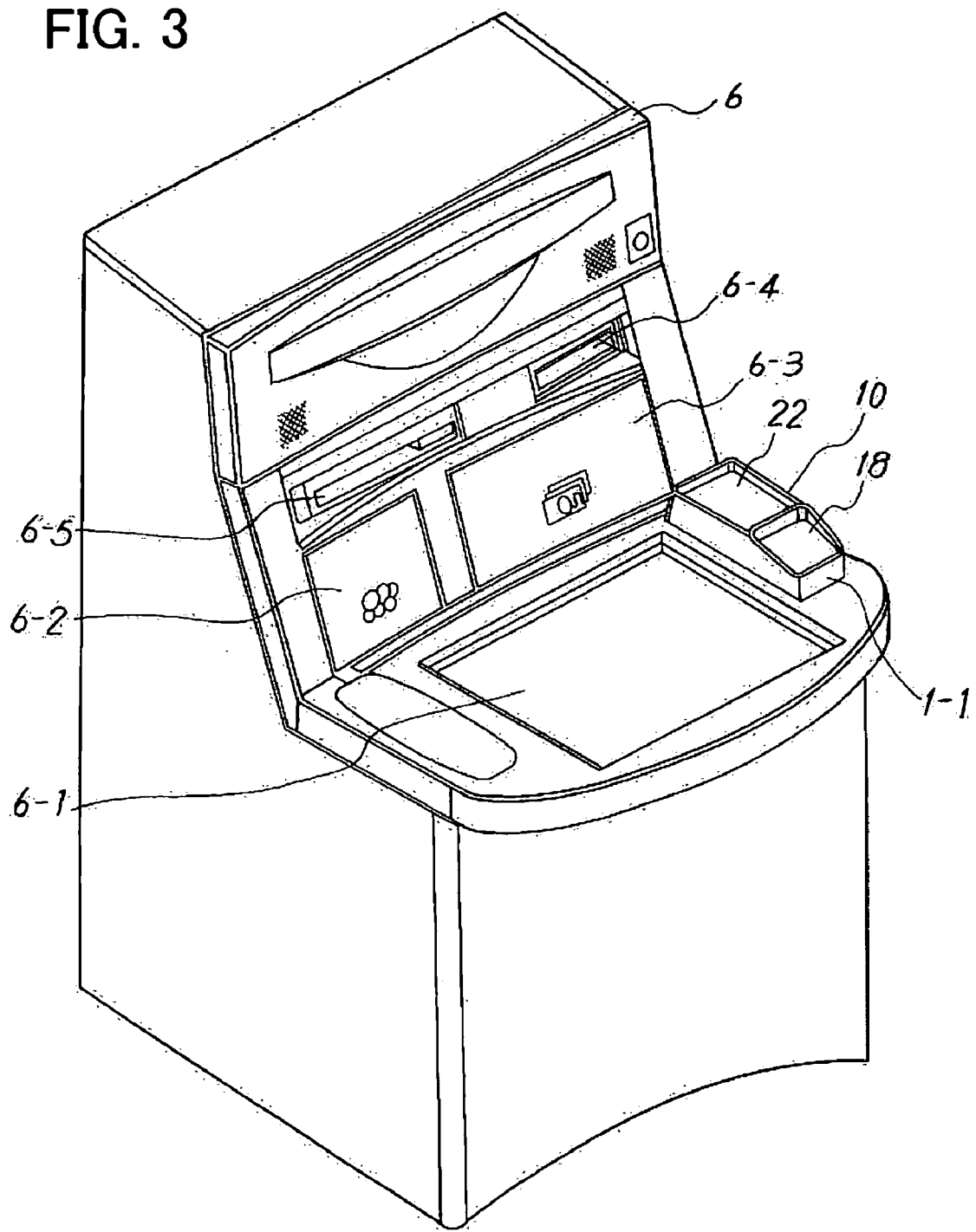
FIG. 3 is an oblique view of the ATM of FIG. 1.
Figure 4:
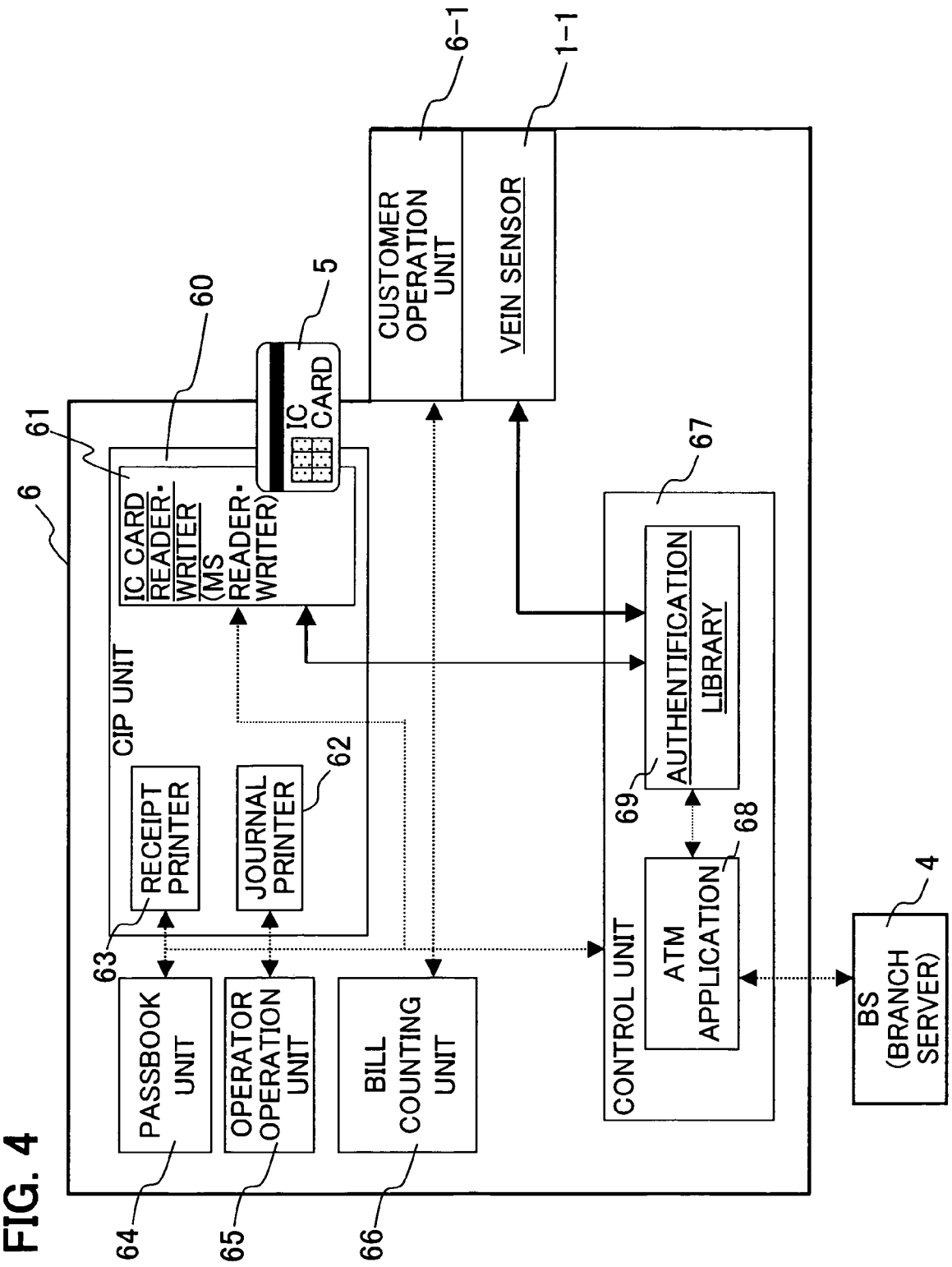
FIG. 4 is a block diagram of the ATM of FIG. 3.

FIG. 1 shows the configuration of a first embodiment of a biometrics system of this invention, FIG. 2 shows the configuration of the service area device of FIG. 1, FIG. 3 is an external view of the automated transaction machine of FIG. 1, and FIG. 4 shows the configuration of the automated transaction machine of FIG. 3.

FIG. 1 shows a palm vein authentication system in a financial institution, as an example of a biometrics system. A branch terminal 2 is provided in a service area of the financial institution. As explained in FIG. 2, the branch terminal 2 is provided with a palm image capture device 1, a branch terminal computer (for example, a personal computer) 2-1 connected to the image capture device 1, a keyboard 2-2, a display 2-3, and an IC card reader/writer 2-4. The palm image capture device 1 may be configured integrally with the IC card reader/writer 2-4.

As indicated in FIG. 2, the palm image capture device 1 has a sensor unit 18, front guide 14 to support the wrist of the user, and a rear guide 13 to guide the fingers of the user. The user, having requested vein authentication, places his hand over this palm image capture device 1. The palm image capture device (hereafter "image capture device") 1 reads the palm image, and sends the image to the computer 2-1.

The IC card reader/writer 2-4 reads and writes data from and to an IC card 5 held by the user. The IC card 5 is a well-known credit card-size card, incorporating an IC chip with memory and a CPU, and having external terminals.

The image capture device 1, IC card reader/writer 2-4, keyboard 2-2, and display 2-3 are connected to the computer 2-1, and perform the blood vessel image extraction, shape registration and other processing, described below.

The terminal 2 is connected to a server 4 via a LAN (Local Area Network) 80. The server 4 has a temporary file 4-1, and is connected to the host 7. The server 4 is also connected to a plurality of automated transaction machines (ATMs) 6 via a second LAN 82.

Such an ATM 6 can be used to perform transactions based on vein authentication. In order to use an ATM 6 to perform withdrawal transactions and other financial transactions, the user holds his hand over the image capture device 1-1 provided in the ATM 6. The image capture device 1-1 reads an image of the palm. The ATM 6 has an IC card reader/writer 60, which reads and writes data in an IC card 5 held by the user.

FIG. 3 and FIG. 4 show the configuration of the ATM 6 of FIG. 1. As shown in FIG. 3, the ATM 6 has, on the front face thereof, a card insertion/ejection aperture 6-4; a bankbook insertion/ejection aperture 6-5; a paper currency insertion/dispensing aperture 6-3; a coin insertion/dispensing aperture 6-2; and a customer operation panel (UOP) 6-1 for operation and display.

Figure 6:
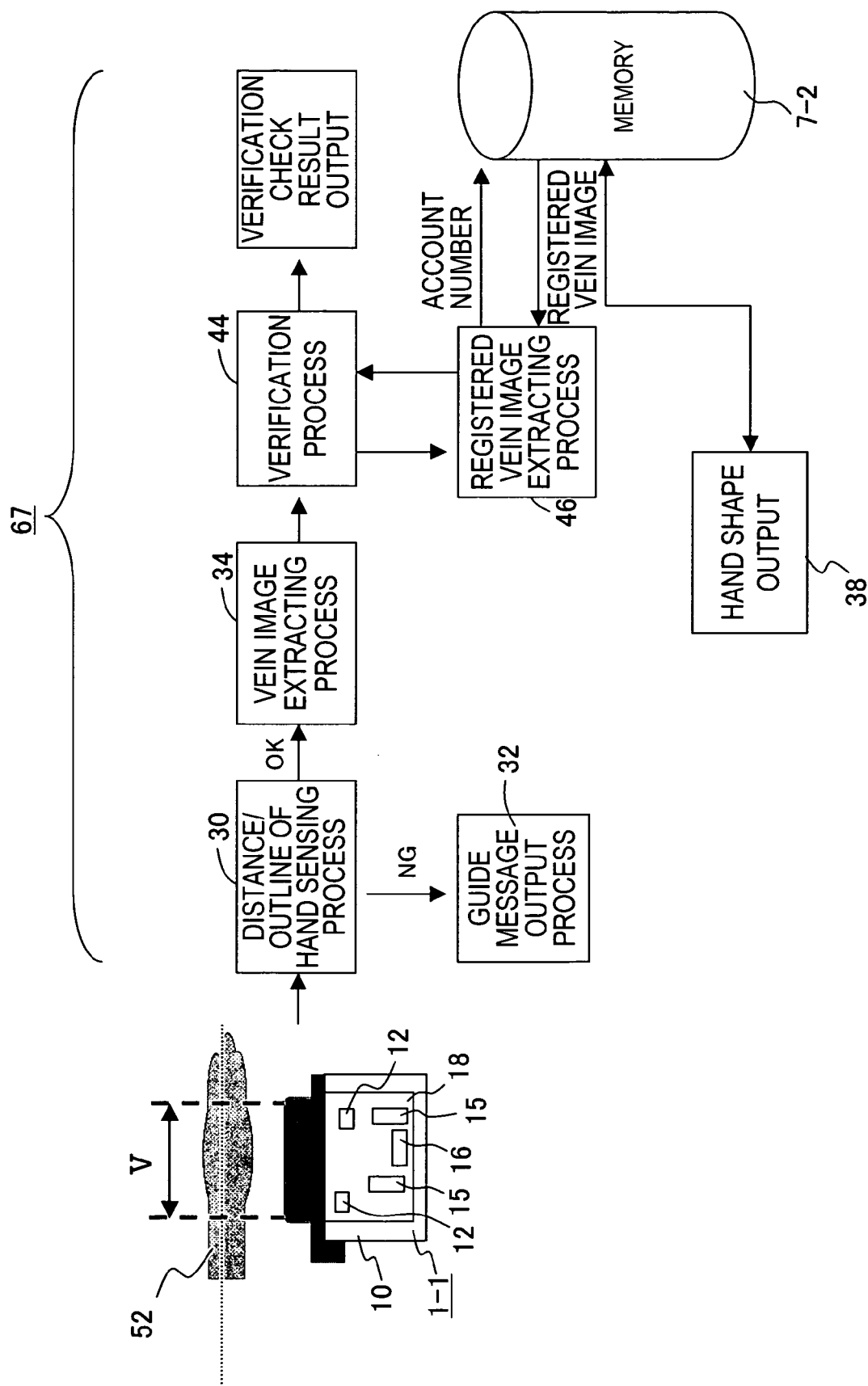
FIG. 6 is a functional block diagram of the biometrics information authentication processing of FIG. 4.

In this example, the image capture device 1-1 is provided on the side of the customer operation panel 6-1. The sensor unit 18 explained in FIG. 4 and FIG. 6 is mounted on the forward side of the main unit 10 of the image capture device 1-1. Further, the sensor unit 18 of the main unit 10 faces rearward and is inclined upward, and a flat portion 22 is provided therebehind.

This image capture device 1-1 differs from the image capture device 1 of FIG. 2 in that the palm guides 14, 13 are not provided. This is because in registration, a single operation is sufficient, but in the case of a transaction based on authentication, dozens of operations are performed; hence in order to alleviate aversion of the user, guides 14, 13 are not provided in the image capture device 1-1 of the ATM 6. A further reason is that the existence of guides 14, 13 poses problems for operation by the user. Of course guides 14, 13 may be provided.

As shown in FIG. 4, the ATM 6 has a CIP (Card Reader Printer) unit 60 with a card insertion/ejection aperture 6-4; a bankbook unit 64 having a bankbook insertion/ejection aperture 6-5; a paper currency/coin counter unit 66 having a paper currency insertion/dispensing aperture 6-3 and a coin insertion/dispensing aperture 6-2; an attendant operation unit 65; a control unit 67; a customer operation panel (UOP) 6-1 for operation and display; and an image capture device (vein sensor) 1-1.

The CIP unit 60 has an IC card reader/writer 61 which reads and writes the magnetic stripe and IC chip of an IC card 5; a receipt printer 63 which records transactions on a receipt; and a journal printer 62 which prints the history of transactions on journal forms.

The bankbook unit 64 records transactions on pages of a bankbook, and when necessary turns the pages. The attendant operation unit 65 is for operations by an attendant, who can display the state and perform operations upon occurrence of a fault or during inspections. The paper currency/coin counting unit 66 validates, counts, and stores inserted paper currency and coins, and counts and dispenses paper currency and coins in the required quantities.

The control unit 67 communicates with the server 4, and has an ATM application 68 which controls ATM operation and an authentication library 69 for authentication processing. A portion of this ATM application 68 acts in concert with the authentication library 69 to control biometrics authentication guidance screens of the UOP 6-1.

In the system of FIG. 1, a blood vessel (vein) image file 7-1 and customer database 7-2 are provided in the host 7. The blood vessel image file 7-1 stores vein data 70 and palm shape data 72 for users who have completed vein authentication registration.

The registration process in this system is explained. A user, having requested vein authentication, holds his hand over the palm image capture device 1 of the service area terminal 2. The image capture device 1 reads the palm image and sends the image to the computer 2-1. The computer 2-1 extracts the blood vessel image for the palm, creates blood vessel image data 70, also creates hand outside shape data 72, and transfers to the server 4 the identification number (for example, account number) read from the IC card 5 as well as the blood vessel image data 70 and external shape data 72. The server 4 converts the transferred data into a prescribed format, and transfers the result to the host 7. The host 7 stores, in the blood vessel image file 7-1, the transferred identification number (for example, account number), blood vessel image data 70, and external shape data 72.

Next, in a transaction based on biometrics authentication, the user inserts the IC card 5 into the IC card reader/writer 60 of the ATM 6, and causes data to be read. This data is transmitted to the host 7 via the LAN 82 and server 4. The host 7 searches the blood vessel image file 7-1, reads the blood vessel image data 70 and external shape data 72 corresponding to the transmitted identification number from the file 7-1, and transmits this data to the ATM 6 via the server 4 and LAN 82. In the ATM 6, this shape data is displayed on the UOP 6-1, reproducing the state of image capture for the user at the time of registration.

By this means, the user can identify the state of image capture at the time of registration. Accordingly, the user places his hand in a similar manner over the image capture device 1-1 of the ATM 6. The image capture device 1-1 reads the image of the palm of the hand, and transmits the image to the control unit 67 of the ATM 6. The control unit 67 extracts the blood vessel image from the palm, creates blood vessel image data 70, verifies the data against the blood vessel image data transmitted from the host 7, and performs individual authentication. If the individual is confirmed satisfactorily, the ATM 6 then permits an ordinary automated transaction.

Configuration of Biometrics Authentication Processing

Figure 5:
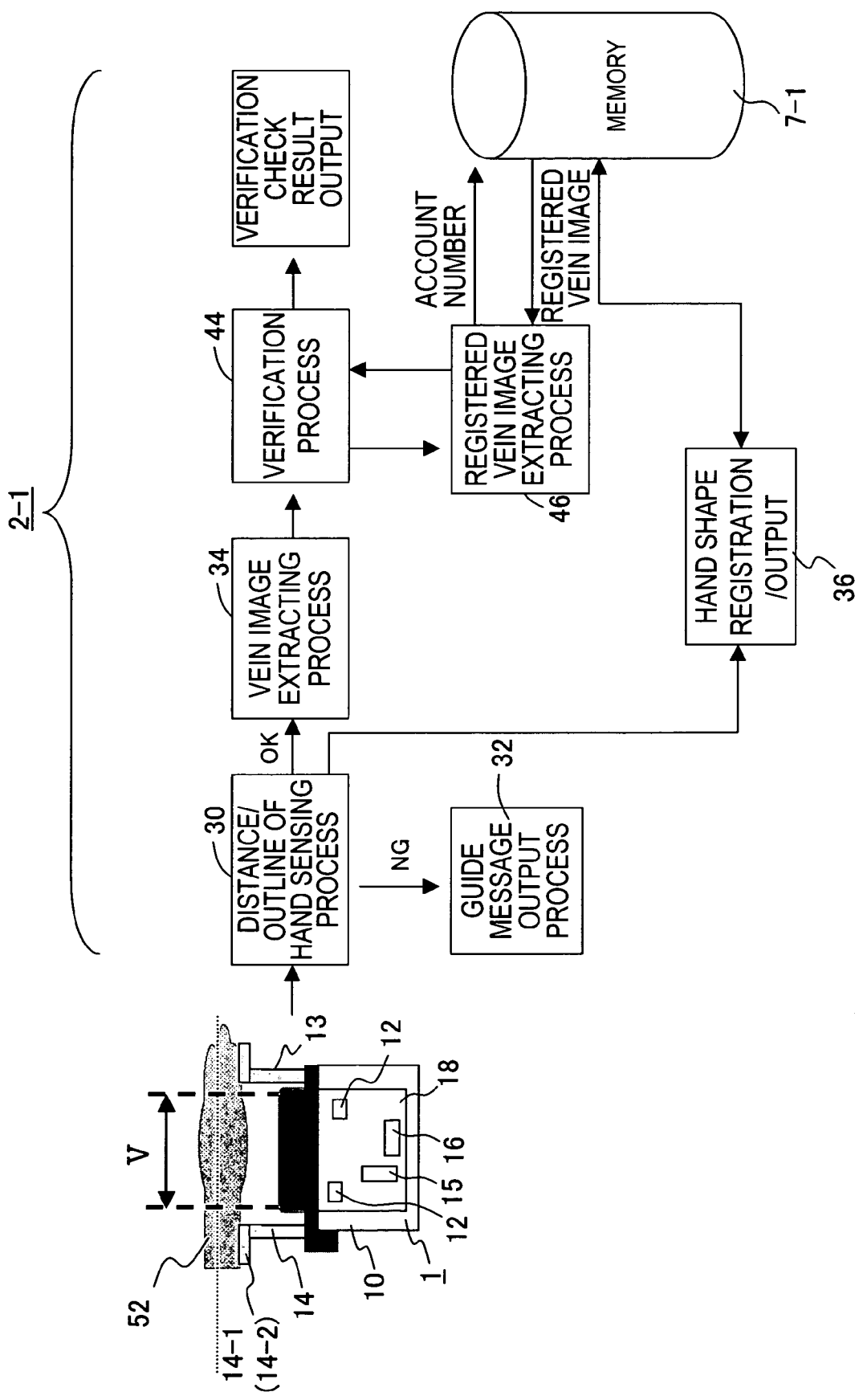
FIG. 5 is a functional block diagram of the biometrics information registration processing of FIG. 2.

FIG. 5 is a block diagram of biometrics authentication processing at the service area terminal in FIG. 1 and FIG. 2, FIG. 6 is a block diagram of biometrics authentication processing by the ATM 6 in FIG. 1, FIG. 3, and FIG. 4, and FIG. 7 and FIG. 8 explain this operation.

As shown in FIG. 5, the palm image capture device 1 of FIG. 1 has a sensor unit 18 installed substantially in the center of the main unit 10. On the forward portion (on the user side) of the sensor unit 18 is provided a front guide 14; on the rear side is provided a rear guide 13. The front guide 14 comprises a sheet of synthetic resin, transparent or substantially transparent.

The front guide 14 serves the purposes of guiding the hand of the user in the front and of supporting the wrist; the rear guide 13 supports the tips of the fingers. Hence guidance and support are provided to the user, with the front guide 14 guiding the wrist above the sensor unit 18. As a result, the attitude of the palm of the hand, that is, the position, inclination, and size over the sensor unit 18 can be controlled. The cross-sectional shape of the front guide 14 has a vertical body and, in the top portion, a horizontal portion 14-1 to support the wrist. A depression 14-2 is formed continuously in the center of the horizontal portion 14-1, to facilitate positioning of the wrist.

The sensor unit 18 is provided with a two-dimensional image capture sensor (infrared sensor) and focusing lens 16 and a distance sensor 15 in the center; on the periphery thereof are provided a plurality of near-infrared light emission elements (LEDs) 12. For example, near-infrared light emission elements are provided at eight places on the periphery, to emit near-infrared rays upwards.

The readable region V of this sensor unit 18 is regulated by the relation between the sensor, focusing lens, and near-infrared light emission region. Hence the position and height of the front guide 14 are set such that the supported palm is positioned in the readable region V.

As indicated in FIG. 5, the authentication library of the computer 2-1 connected to the image capture device 1 executes a series of registration processing 30 to 36, 44 and 46.

Distance/hand outline detection processing 30 receives the distance measured by the distance sensor 16 of the image capture devices 1, judges whether the palm of the hand or other object is at a distance in a prescribed range from the sensor unit 18, and also detects the outline of the hand from the image captured by the sensor unit 18 and judges from the outline whether the image can be used in registration and verification processing. For example, the palm may not appear sufficiently in the image.

Guidance message output processing 32 outputs, to UOP 6-1 of the ATM 6, a message to guide the palm to the left or right, forward or backward, upward or downward, when the distance measured by the distance sensor 16 indicates that the hand is outside the image capture range, or when the image cannot be used in registration and verification processing. By this means, the palm of the hand of the user is guided into position over the image capture device 1.

Blood vessel image extraction processing 34 extracts a vein image from the image of the hand when hand outline detection processing 30 judges that an image has been captured with the hand held correctly. That is, blood vessel (vein) data 70 of the image of the palm such as that in FIG. 8 is extracted through differences in reflectivity. FIG. 8 shows the vein blood vessel image as an image, but the corresponding data is grayscale data of this image.

Hand shape registration/output processing 36 stores in the storage portion (in FIG. 1, the blood vessel image file 7-1 in the host 7), together with an account number, external shape data 72 for the hand (see FIG. 7) when an image is captured with the hand held correctly in hand outline detection processing 30. This hand shape data may be a bitmap of a captured image, as in FIG. 7, or may be outline data of the hand, extracted from a captured image.

Registered blood vessel image registration/search processing 46 stores blood vessel image data detected in the blood vessel image detection processing 34, together with the account number, in the storage portion (in FIG. 1, in the blood vessel image file 7-1 of the host 7). In order to perform trial verification at the time of registration, the registered blood vessel image data sets R1, R2, R3 corresponding to the individual ID (account number) read from the IC card 5 indicated in FIG. 1 and FIG. 2 are retrieved from the storage portion 7-1. In verification processing 44, the blood vessel image data N1 detected in blood vessel image detection processing 34 and registered blood vessel image data N2 are compared, verification processing is performed, and a verification result is output.

Similarly, in hand shape registration/output processing 36 the registered external shape data corresponding to the individual ID (account number) read from the IC card 5 of FIG. 1 and FIG. 2 is retrieved from the storage portion 7-1 and is displayed on the display 2-3.

Next, FIG. 6 is used to explain the biometrics authentication mechanism of the ATM 6. The image capture device 1-1 of FIG. 1 and FIG. 3 has a sensor unit 18 installed substantially in the center of the main unit 10. As explained above, this image capture device 1-1 differs from the image capture device 1 of FIG. 5 in that a front guide 14 and rear guide 13 are not provided.

The sensor unit 18 is provided with a two-dimensional image capture sensor (infrared sensor) and focusing lens 16 and a distance sensor 15 in the center; on the periphery thereof are provided a plurality of near-infrared light emission elements (LTMs) 12. For example, near-infrared light emission elements are provided at eight places on the periphery, to emit near-infrared rays upwards. The readable region V of this sensor unit 18 is regulated by the relation between the sensor, focusing lens, and near-infrared light emission region.

Next, the authentication library 69 of the ATM 6 is explained. The authentication library 69 of the control unit 67 of the ATM 6 connected to the image capture device 1-1 executes the series of verification processing 30 to 34, 38, 44, 46. The control unit 67 of the ATM 6 has, for example, a CPU and various types of memory, an interface circuit, and other circuitry necessary for data processing. This CPU executes the series of registration processing 30 to 34, 38, 44 and 46.

In FIG. 6, portions which are the same as in FIG. 5 are assigned the same symbols. That is, in FIG. 6, the distance/outline detection processing 30, guidance message output processing 32, and blood vessel image extraction processing 34 are the same as in FIG. 5.

Registered blood vessel image search processing 46 retrieves registered blood vessel image data sets R1, R2, R3 corresponding to the individual ID (account number) of the IC card 5 from the storage portion 7-1. Verification processing 44 compares the blood vessel image data set N1 retrieved in blood vessel image detection processing 34 with the registered blood vessel image data set N2, performs verification processing, and outputs a verification result.

Hand shape output processing 38 retrieves registration shape data 72 corresponding to the individual ID (account number) of the IC card 5 from the above-described storage portion 7-1, and displays the data on the UOP 6-1. The displayed image may be a bitmap of the image at the time of registration, as in FIG. 7, or may be outline data of the hand, extracted from the captured image.

In such a biometrics authentication system, the above-described captured image for use in authentication at the time of registration is registered, and the display of this image to the user at the time of authentication is convenient for the user, and is advantageous with respect to operation by users not familiar with the authentication system, and with respect to rapid authentication.

Biometrics Registration Processing

Figure 9:
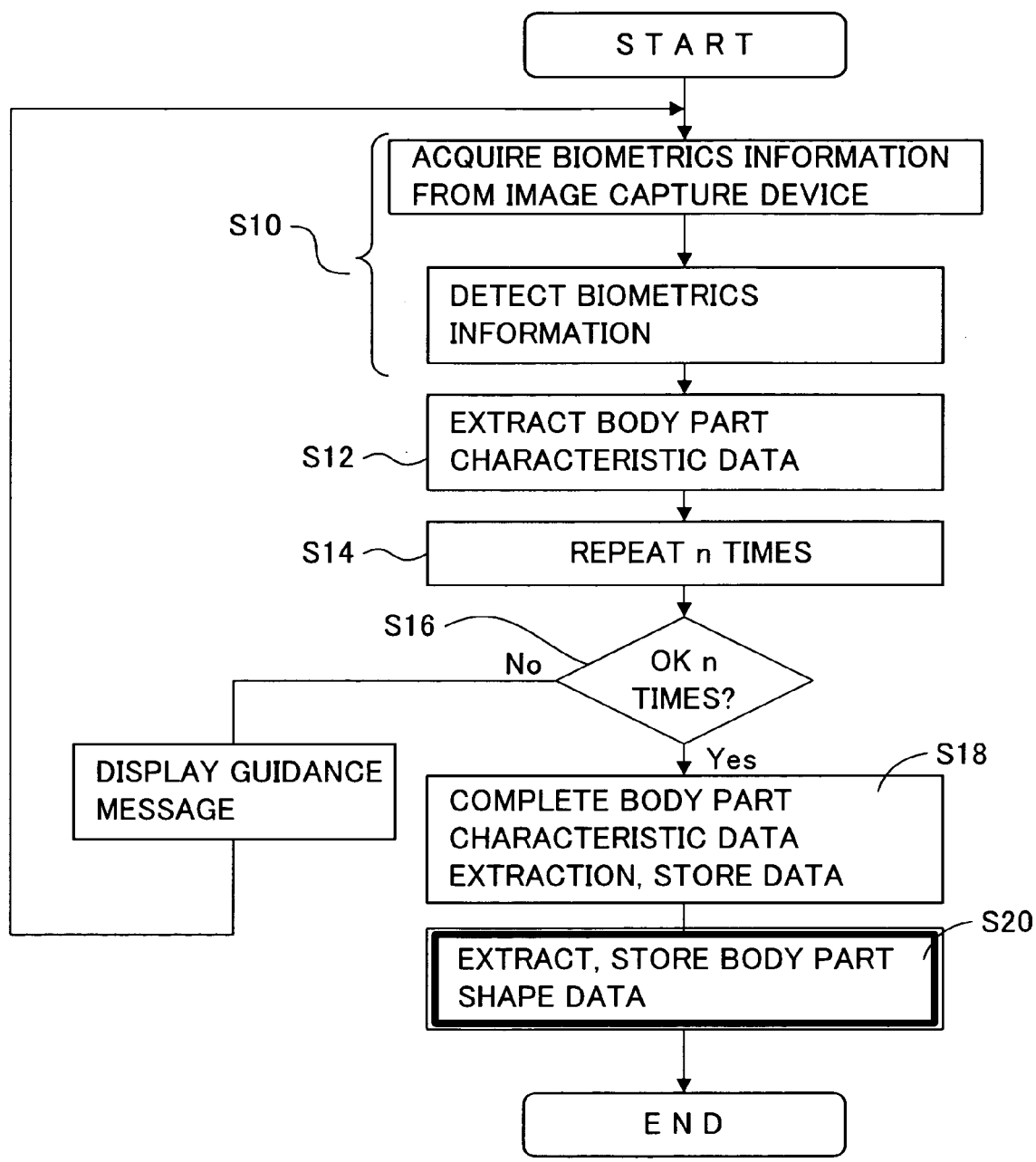
FIG. 9 shows the flow of biometrics information registration processing in one embodiment of the invention.

Next, the biometrics registration processing of FIG. 5 is explained. FIG. 9 shows the flow of biometrics registration processing in one embodiment of the invention. Below, the biometrics registration processing of FIG. 9 is explained, referring to FIG. 2 and FIG. 5.

(S10) The user, having requested vein authentication, holds his hand over the palm image capture device 1 of the service area terminal 2. The image capture device 1 reads an image of the palm, and sends the image to the computer 2-1.

(S12) The computer 2-1 extracts a blood vessel image of the palm from the read-out image, and creates blood vessel image data 70. This blood vessel image data is the result of extracting specific characteristics of the blood vessel image shown in FIG. 8 (the directions and numbers of trunks and branches of blood vessels, and similar).

(S14) The processing of these steps S10 and S12 is repeated a plurality of times (for example, n times), and after being repeated n times (for example, three times), a plurality of blood vessel image data sets are obtained.

(S16) The computer judges whether the similarity of the plurality of blood vessel image data sets is equal to or exceeds a threshold value. If the similarity is not equal to or greater than the threshold value, erroneous recognition may have occurred, and so a guidance message such as "please extend your hand again" is displayed on the UOP 6-1, and processing returns to step S10.

(S18) If the similarity of the plurality of blood vessel image data sets is equal to or greater than the threshold value, these blood vessel image data sets are transferred to the server 4, together with the identification number (for example, the account number) read from the IC card 5.

(S20) Further, the image read by the image capture device 1 (see FIG. 7), which was the basis for creation of the blood vessel image data, is transferred to the server 4. The server 4 converts the transferred data into a prescribed format, and transfers the result to the host 7. The host 7 stores the transferred identification number (for example, account number), blood vessel image data 70, and external shape data (read-out image) 72 to the blood vessel image file 7-1.

In this way, the image captured at the time of registration is stored together with blood vessel image data.

Biometrics Authentication Processing

Figure 10:
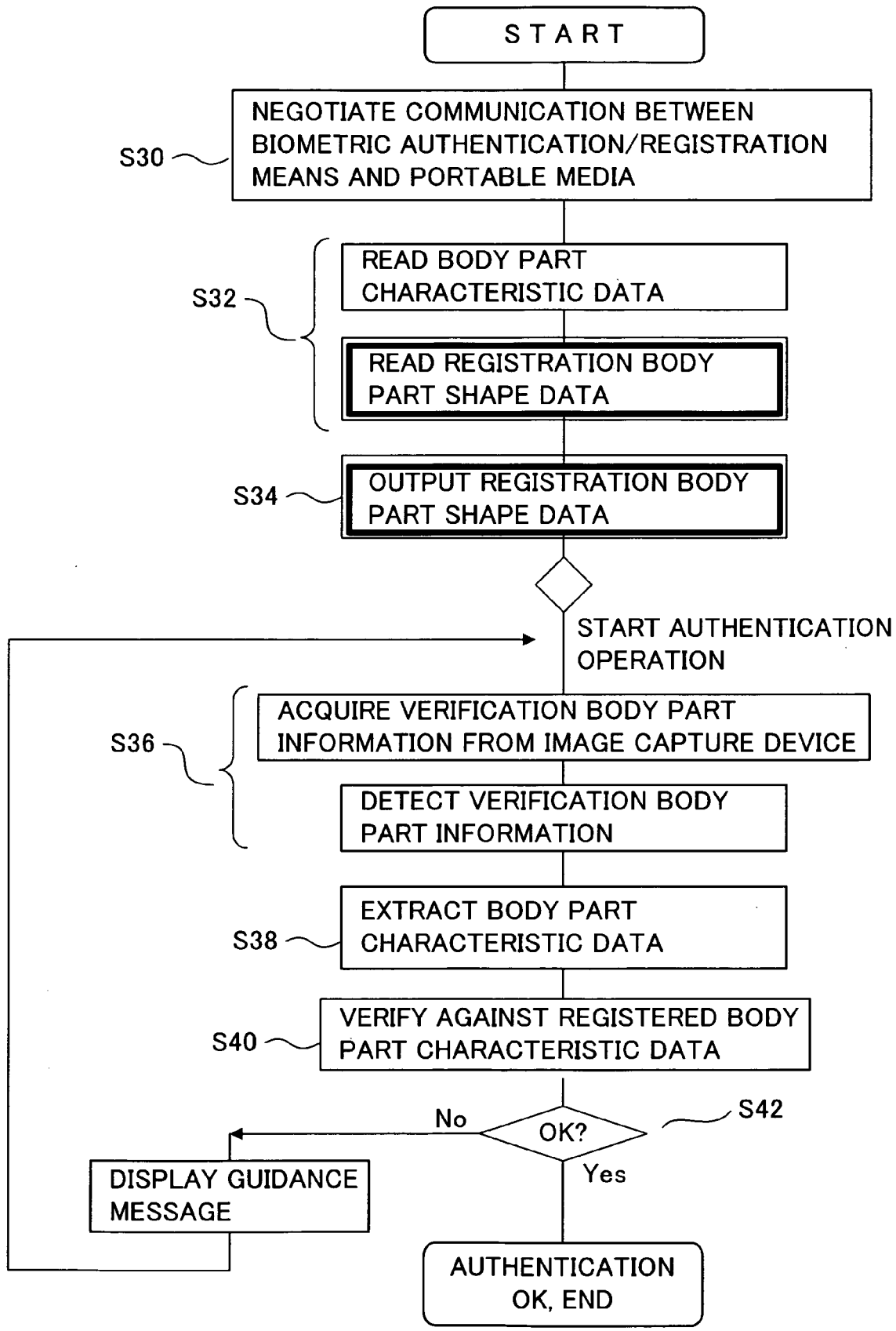
FIG. 10 shows the flow of biometrics authentication processing in one embodiment of the invention.

Next, biometrics authentication processing in the ATM 6 of FIG. 3 and FIG. 4 is explained. FIG. 10 shows the flow of biometrics authentication processing in an embodiment of the invention. Below, the biometrics authentication processing of FIG. 10 is explained referring to FIG. 3, FIG. 4, and FIG. 6.

(S30) In a customer wait state, the control unit 67 of the ATM 6 detects whether a transaction key on the UOP 6-1 has been pressed. If a transaction key has been pressed, and an IC card 5 is inserted into the IC card reader/writer 60 of the ATM 6, the IC card reader/writer 60 reads data from the IC card 5.

(S32) This data is transmitted to the host 7 via the LAN 82 and server 4. The host 7 searches the blood vessel image file 7-1 and reads the blood vessel image data 70 and external shape data 72 corresponding to the transmitted identification number from the file 7-1, and transmits the data to the ATM 6 via the server 4 and LAN 82.

(S34) At the ATM 6, the external shape at the time of registration from the transmitted external shape data 72 is displayed on the UOP 6-1, to reproduce the state of image capture for the user at the time of registration. The displayed contents are the same as those shown in FIG. 7.

(S36) Seeing this, the user extends his hand over the image capture device 1-1 of the ATM 6. The image capture device 1-1 reads an image of the palm, acquires verification body part information, and sends the information to the control unit 67 of the ATM 6. The control unit 67 detects the blood vessel image data (verification body part information) for the palm.

(S38) Further, the control unit 67 extracts body part characteristic data (for example, the directions and numbers of trunks and lengths of branches of blood vessels, and similar) from the blood vessel image data.

(S40) Further, the control unit 67 verifies the extracted body part characteristic data against the blood vessel image characteristic data transmitted from the host 7, and confirms the identity of the individual.

(S42) If the individual confirmation is satisfactory, then the control unit 67 outputs an authentication OK result, and the ATM 6 permits normal automated transactions. If on the other hand the individual confirmation is not satisfactory, the control unit 67 displays a guidance message on the UOP 6-1, and processing returns to step S36. As the guidance message, the cause of standard verification non-coincidence is displayed. For example, "Please spread your palm", "Your hand position is shifted", or other text, and a standard operation order image, may be displayed.

In this way, an image of the body part shape captured for the user at the time of registration of biometrics data is registered, and at the time of user authentication, by displaying this body part shape, the user can directly identify the state of body part image capture at the time of registration. As a result, the user can be guided into a state of body part image capture similar to that at the time of registration, so that at the time of authentication effective guidance can be provided regarding positioning of the body part so as to match the circumstances of body part image capture during registration, to improve the efficiency of verification.

Further, even when biometrics authentication is not successful, guidance can be provided to move the body part to the circumstances of body part image capture at the time of registration without causing the user to be confused, thus facilitating biometrics authentication of the user. Particularly when used in automated equipment, dedicated personnel may not be on site, but the user can be provided with reliable guidance, thus improving the efficiency of verification and contributing to shorten the time required for verification.

Other Biometrics Authentication Processing

Figure 11:
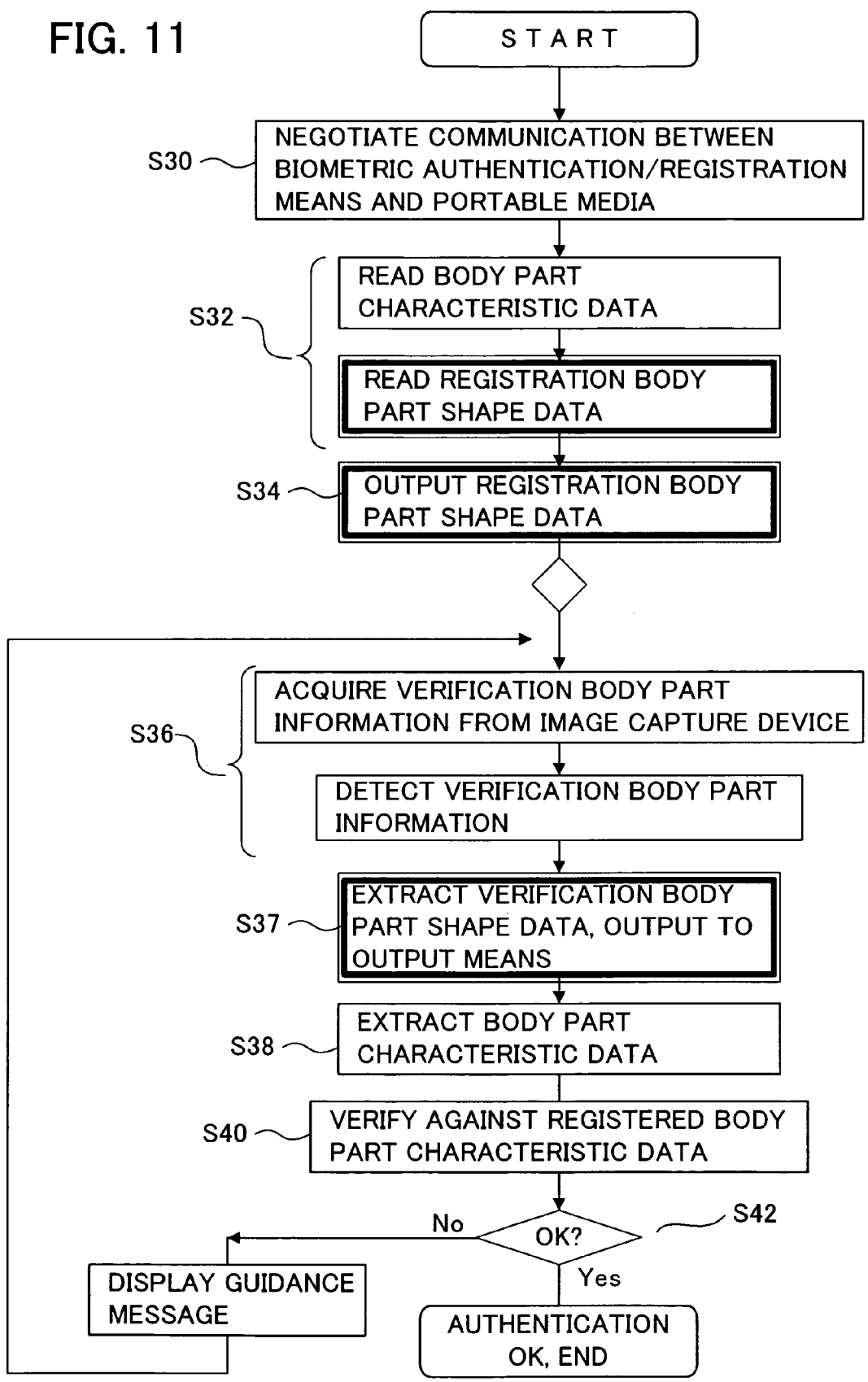
FIG. 11 shows the flow of biometrics authentication processing in another embodiment of the invention.
Figure 12:
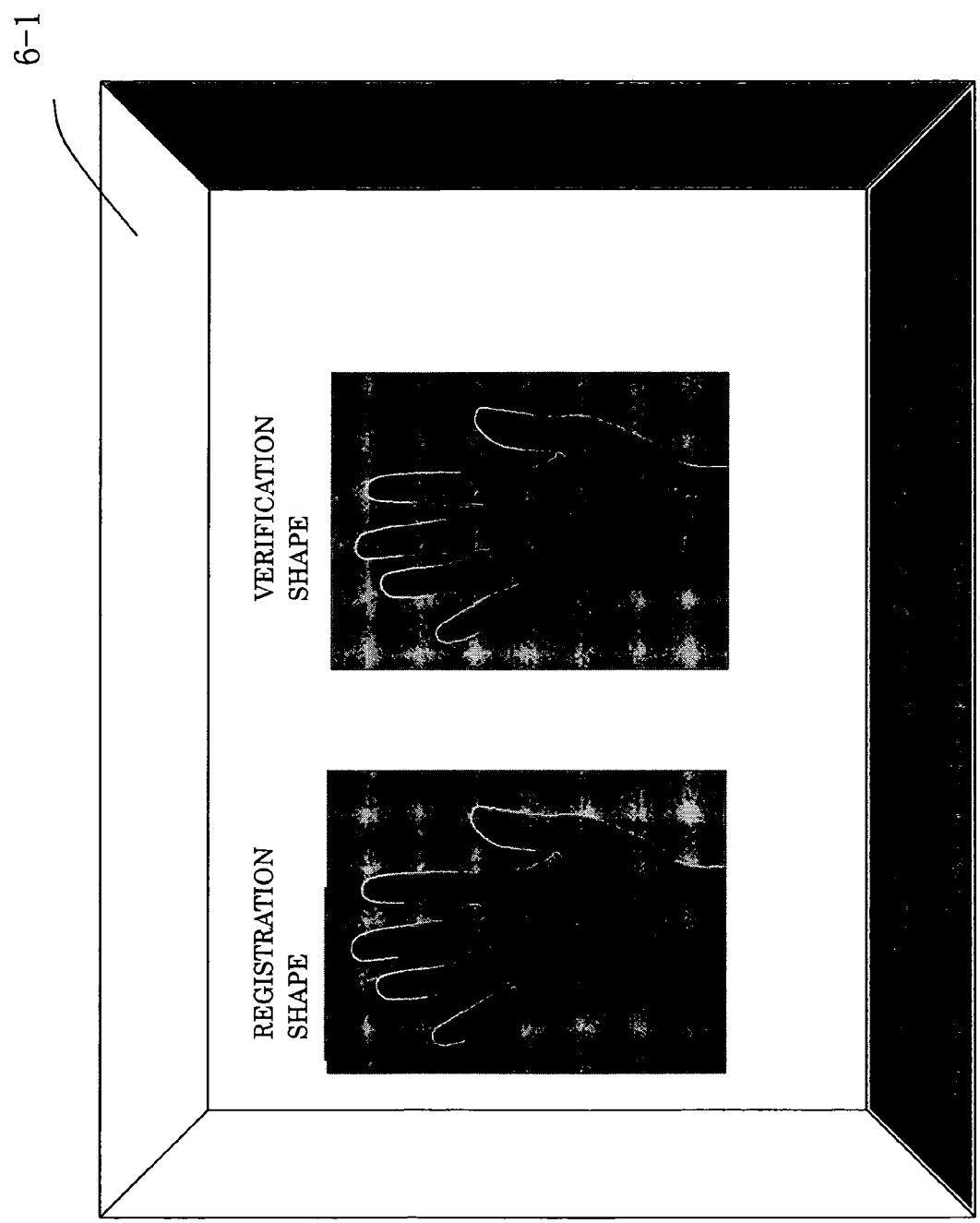
FIG. 12 explains the body part shape display example of FIG. 11.

Next, other biometrics authentication processing in the ATM 6 of FIG. 3 and FIG. 4 is explained. FIG. 11 shows the flow of biometrics authentication processing in another embodiment of the invention; FIG. 12 explains the body part shape display example. Below, the biometrics authentication processing of FIG. 11 is explained referring to FIG. 3, FIG. 4, FIG. 6, and FIG. 12. Steps which are the same as in FIG. 10 are assigned the same symbols.

(S30) In a customer wait state, the control portion 67 of the ATM 6 detects whether a transaction key on the UOP 6-1 has been pressed. If a transaction key has been pressed, and an IC card 5 is inserted into the IC card reader/writer 60 of the ATM 6, the IC card reader/writer 60 reads data from the IC card 5.

(S32) This data is transmitted to the host 7 via the LAN 82 and server 4. The host 7 searches the blood vessel image file 7-1 and reads the blood vessel image data 70 and external shape data 72 corresponding to the transmitted identification number from the file 7-1, and transmits the data to the ATM 6 via the server 4 and LAN 82.

(S34) At the ATM 6, the external shape at the time of registration from the transmitted external shape data 72 is displayed on the UOP 6-1, to reproduce the state of image capture for the user at the time of registration. The displayed contents are the same as those shown in FIG. 7.

(S36) Seeing this, the user extends his hand over the image capture device 1-1 of the ATM 6. The image capture device 1-1 reads an image of the palm, acquires verification body part information, and sends the information to the control portion 67 of the ATM 6. The control unit 67 detects the blood vessel image data (verification body part information) for the palm.

(S37) The control unit 67 extracts the verification body part information (body part shape data) acquired in step S36, displays this body part shape at the time of verification parallel with the external shape at the time of registration displayed in step S34 on the UOP 6-1. As shown in FIG. 12, the external shape at the time of verification (verification shape) is combined with the external shape at the time of registration (registration shape), and both are displayed on the UOP 6-1. In this example, the external shape of the hand at the time of registration (registration shape) is displayed together with the external shape of the hand at the time of verification (verification shape).

(S38) Further, the control unit 67 extracts body part characteristic data (for example, the directions and numbers of trunks and lengths of branches of blood vessels, and similar) from the blood vessel image data.

(S40) Further, the control unit 67 verifies the extracted body part characteristic data against the blood vessel image characteristic data transmitted from the host 7, and confirms the identity of the individual.

(S42) If the individual confirmation is satisfactory, then the control unit 67 outputs an authentication OK result, and the ATM 6 permits normal automated transactions. If on the other hand the individual confirmation is not satisfactory, the control unit 67 displays a guidance message on the UOP 6-1, and processing returns to step S36. As the guidance message, the cause of standard verification non-coincidence is displayed. For example, "Please spread your palm", "Your hand position is shifted", or other text, and a standard operation order image, may be displayed.

In this way, the body part shape captured for the user at the time of registration of biometrics data is registered, and at the time of user authentication, by displaying this body part shape and the body part shape during verification, the user can directly identify the state of body part image capture at the time of registration and the state of body part image capture at the time of verification. As a result, when biometrics authentication is unsuccessful, the user can be guided into a state of body part image capture similar to that at the time of registration, so that at the time of authentication effective guidance can be provided regarding positioning of the body part so as to match the circumstances of body part image capture during registration, to improve the efficiency of verification.

Further, guidance can be provided to move the body part to the circumstances of body part image capture at the time of registration without causing the user to be confused, thus facilitating biometrics authentication of the user. Particularly when used in automated equipment, dedicated personnel may not be on site, but the user can be provided with reliable guidance, thus improving the efficiency of verification and contributing to shorten the time required for verification.

Second Embodiment of a Biometrics System

Figure 13:
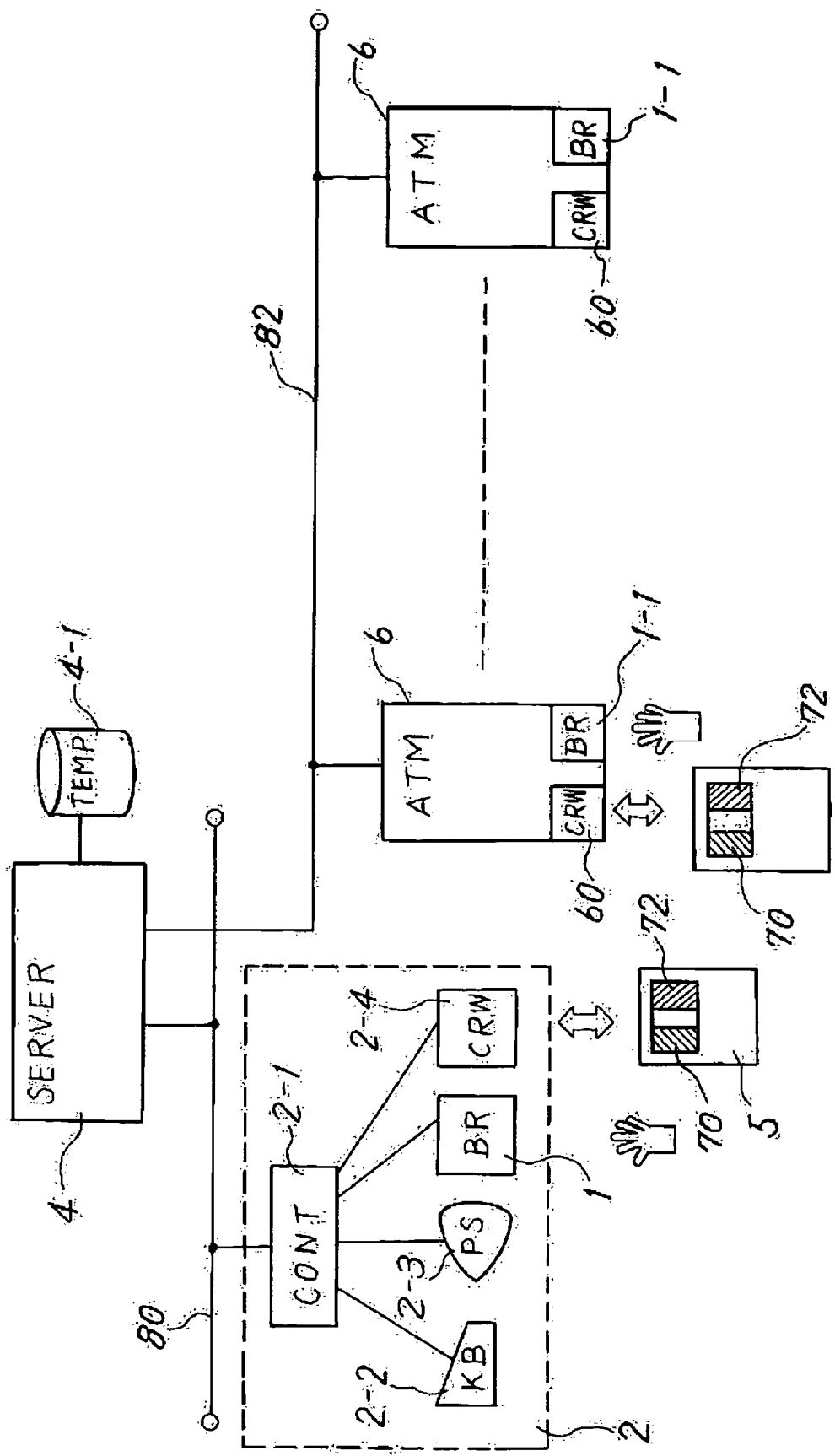
FIG. 13 shows the configuration of the biometrics system of a second embodiment of the invention.

FIG. 13 shows the configuration of the biometrics system of a second embodiment of the invention. In FIG. 13, similarly to FIG. 1, a palm vein authentication system in a financial institution is shown as an example of a biometrics authentication system. In FIG. 13, portions which are the same as in FIG. 1 are assigned the same symbols.

In FIG. 13, the branch terminal 2 explained in FIG. 2 is provided in a service area of the financial institution. As explained in FIG. 2, the branch terminal 2 is provided with a palm image capture device 1, and, connected thereto, a branch terminal computer (for example, a personal computer) 2-1, keyboard 2-2, display 2-3, and IC card reader/writer 2-4.

Similarly to FIG. 2, the palm image capture device 1 has a sensor unit 18, front guide 14 to support the wrist of the user, and a rear guide 13 to guide the fingers of the user. The user, having requested vein authentication, places his hand over this palm image capture device 1. The image capture device (hereafter "image capture device") 1 reads the palm image, and sends the image to the computer 2-1.

The IC card reader/writer 2-4 reads and writes data from and to an IC card 5 held by the user. The IC card 5 is a well-known credit card-size card, incorporating an IC chip with memory and a CPU, and having external terminals.

The image capture device 1, IC card reader/writer 2-4, keyboard 2-2, and display 2-3 are connected to the computer 2-1, and perform the blood vessel image extraction, shape registration and other processing, described above.

This terminal 2 is connected, via a LAN (Local Area Network) 80, to the server 4. The server 4 has a temporary file 4-1, and is connected to a host (the host 7 of FIG. 1), not shown. The server 4 is connected, via a second LAN 82, to a plurality of automated transaction machines (ATMs) 6.

This ATM 6 can be used to perform transactions based on vein authentication. When a user uses an ATM 6 to perform withdrawal or other cash transaction, he extends his hand over an image capture device 1-1, provided in the ATM 6. The image capture device 1-1 reads an image of the palm. The ATM 6 has an IC card reader/writer 60, and reads and writes the data from and onto the IC card 5 held by the user.

In this embodiment, at the time of registration the terminal 2 stores blood vessel characteristic data 70 and external shape data 72 in the IC card 5 of the user. At the ATM 6, the IC card reader/writer 60 reads the external shape data in the IC card 5 and displays the external shape on the UOP 6-1.

Further, the IC card 5 is provided with the functions for verification processing 44 and registered blood vessel image search processing 46 of FIG. 6. Blood vessel image characteristic data at the time of verification, read by the image capture device 1-1 of the ATM 6 and extracted, is transmitted to the IC card 5 via the IC card reader/writer 60. The IC card 5 verifies the registered blood vessel image characteristic data against verification blood vessel image characteristic data through the above-described verification processing 44 and registered blood vessel image search processing 46, and notifies the control unit 67 in the ATM 6 of the verification result.

As a result, the registered blood vessel image data 70 remains held in the IC card 5, and is not read by the ATM 6, so that illicit replication and similar can be prevented, contributing to improved security.

As explained in FIG. 11 and FIG. 12, the external shape at the time of verification (verification shape) can also be displayed on the UOP 6-1 together with the external shape at the time of registration (registration shape). That is, as shown in FIG. 12, the external shape of the hand at the time of verification (verification shape) is displayed together with the external shape of the hand at the time of registration (registration shape).

In this embodiment also, in addition to advantageous results similar to those of FIG. 1, verification is performed within the IC card 5, contributing to improved security; moreover, because communication with the host 7 and server 4 is not necessary for display of external shapes, the burden on the host 7 and server 4 is alleviated, and the vein database 7-1 in the host 7 can be reduced in size.

Third Embodiment of a Biometrics System

Figure 14:
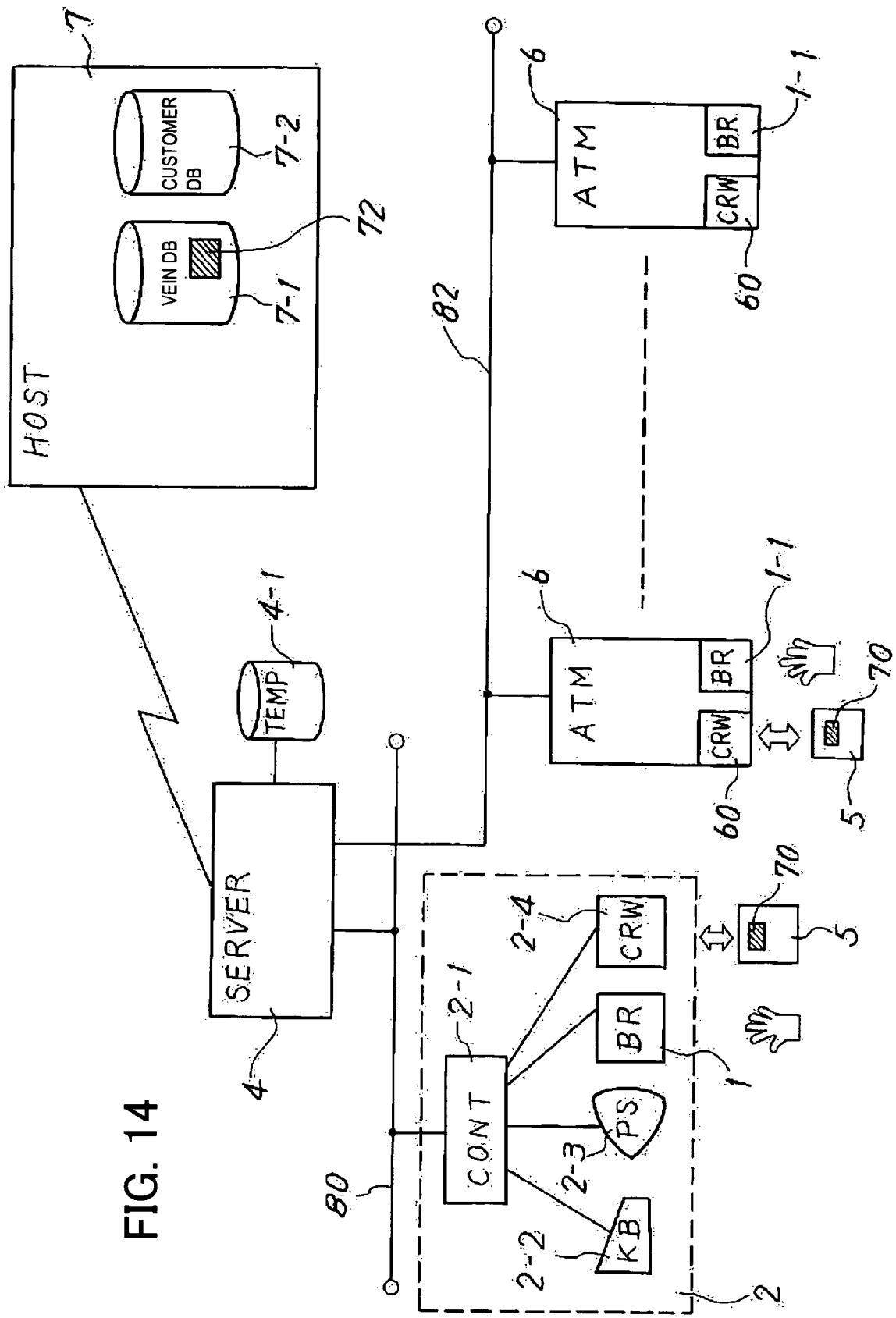
FIG. 14 shows the configuration of the biometrics system of a third embodiment of the invention; and, FIG. 15 shows the configuration of the biometrics system of a fourth embodiment of the invention.

FIG. 14 shows the configuration of a third embodiment of a biometrics authorization system of this invention. In FIG. 14, similarly to FIG. 1 and FIG. 13, a palm vein authentication system in a financial institution is shown, as an example of a biometrics system. In FIG. 14, portions which are the same as in FIG. 1 and FIG. 13 are assigned the same symbols.

In FIG. 14, a branch terminal 2 explained in FIG. 2 is provided in a service area of the financial institution. As explained in FIG. 2, the branch terminal 2 is provided with a palm image capture device 1, a branch terminal computer (for example, a personal computer) 2-1 connected to the image capture device 1, a keyboard 2-2, a display 2-3, and an IC card reader/writer 2-4.

Similarly to FIG. 2, the palm image capture device 1 has a sensor unit 18, front guide 14 to support the wrist of the user, and a rear guide 13 to guide the fingers of the user. The user, having requested vein authentication, places his hand over this palm image capture device 1. The image capture device (hereafter "image capture device") 1 reads the palm image, and sends the image to the computer 2-1.

The IC card reader/writer 2-4 reads and writes data from and to an IC card 5 held by the user. The IC card 5 is a well-known credit card-size card, incorporating an IC chip with memory and a CPU, and having external terminals.

The image capture device 1, IC card reader/writer 2-4, keyboard 2-2, and display 2-3 are connected to the computer 2-1, and perform the blood vessel image extraction, shape registration and other processing, described above.

The terminal 2 is connected to a server 4 via a LAN (Local Area Network) 80. The server 4 has a temporary file 4-1, and is connected to the host 7. The server 4 is also connected to a plurality of automated transaction machines (ATMs) 6 via a second LAN 82.

Such an ATM 6 can be used to perform transactions based on vein authentication. In order to use an ATM 6 to perform withdrawal transactions and other financial transactions, the user holds his hand over the image capture device 1-1 provided in the ATM 6. The image capture device 1-1 reads an image of the palm. The ATM 6 has an IC card reader/writer 60, which reads and writes data in an IC card 5 held by the user.

In this embodiment, at the time of registration the terminal 2 stores blood vessel image characteristic data 70 in the IC card 5 of the user, and stores external shape data 72 in the vein database 7-1 of the host 7. At the ATM 6, the IC card 5 of the user is inserted into the IC card reader/writer 60, an identification number is read, external shape data is read from the vein database 7-1 of the host 7 via the server 4, and the external shape is displayed on the UOP 6-1.

The IC card 5 is provided with the functions for verification processing 44 and registered blood vessel image search processing 46 of FIG. 6. Blood vessel image characteristic data at the time of verification, which is read and extracted by the image capture device 1-1 of the ATM 6, is transmitted to the IC card 5 via the IC card reader/writer 60. By means of the above-described verification processing 44 and registered blood vessel image search processing 46, the IC card 5 verifies the registered blood vessel image characteristic data against the verification blood vessel image characteristic data, and notifies the control unit 67 of the ATM 6 of the verification result.

As a result of the above, the registered blood vessel image data 70 remains held in the IC card 5, and is not read by the ATM 6, so that illicit reproduction can be prevented, contributing to improved security.

Further, as explained in FIG. 11 and FIG. 12, in addition to the external shape at the time of registration (registration shape), the external shape at the time of verification (verification shape) can also be displayed on the UOP 6-1. That is, as shown in FIG. 12, the external shape of the hand at the time of registration (registration shape) is combined with the external shape of the hand at the time of verification (verification shape) and displayed.

In this embodiment also, in addition to advantageous results similar to those of FIG. 1, verification is performed within the IC card 5, contributing to improved security; moreover, because external shapes are not used directly in biometrics authentication, degradation of security can be prevented even when such shapes are stored on the host 7, and the burden on the IC card 5 can be alleviated.

Fourth Embodiment of a Biometrics System

Figure 15:
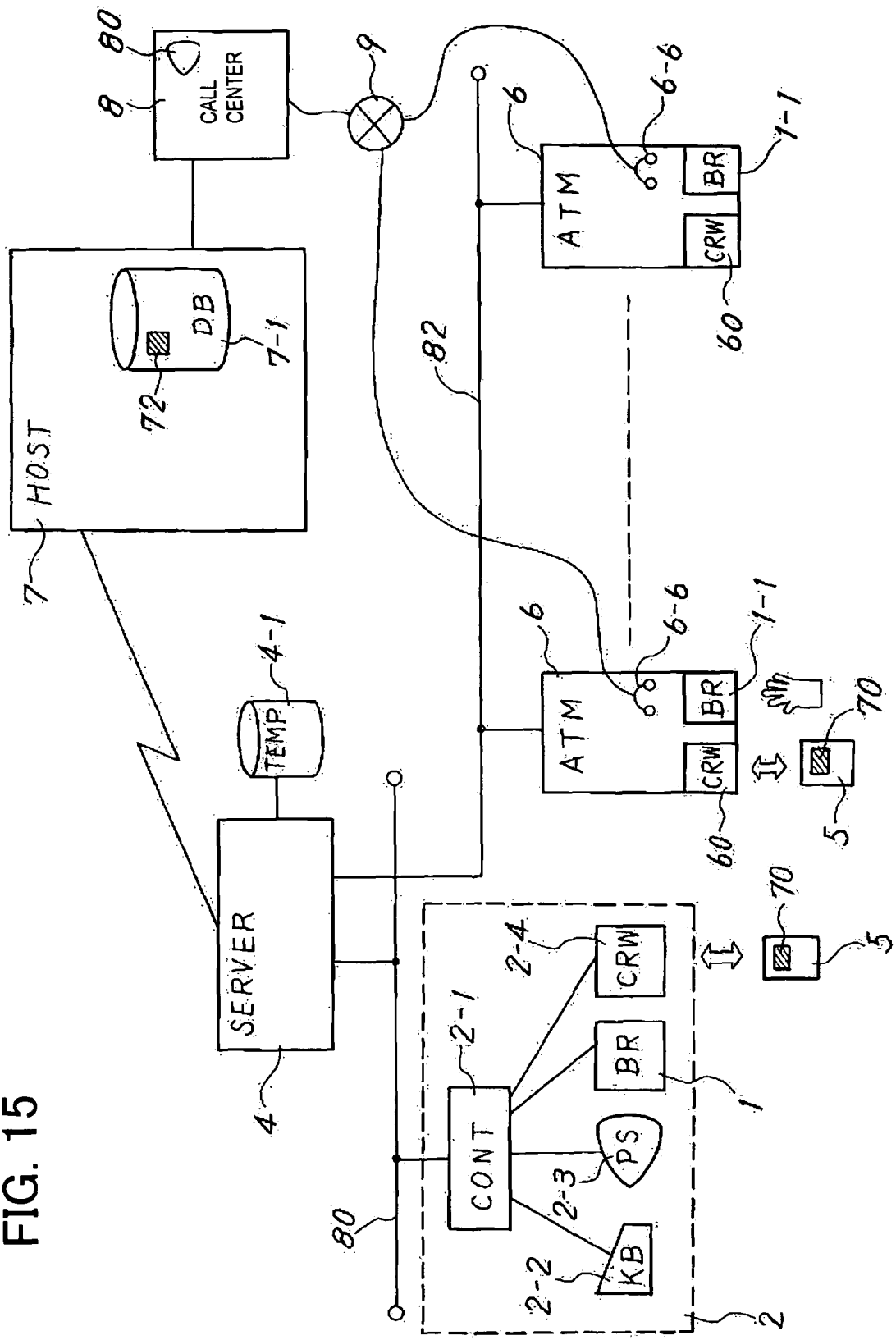

FIG. 15 shows the configuration of the biometrics authentication system of a fourth embodiment of the invention. In FIG. 15, similarly to FIG. 1, FIG. 13 and FIG. 14, a palm vein authentication system in a financial institution is shown as an example of a biometrics authentication system. In FIG. 15, portions which are the same as in FIG. 1, FIG. 13, and FIG. 14 are assigned the same symbols.

In FIG. 15, the branch terminal 2 explained in FIG. 2 is provided in a service area of the financial institution. As explained in FIG. 2, the branch terminal 2 is provided with a palm image capture device 1, and, connected thereto, a branch terminal computer (for example, a personal computer) 2-1, keyboard 2-2, display 2-3, and IC card reader/writer 2-4.

Similarly to FIG. 2, the palm image capture device 1 has a sensor unit 18, front guide 14 to support the wrist of the user, and a rear guide 13 to guide the fingers of the user. The user, having requested vein authentication, places his hand over this palm image capture device 1. The image capture device (hereafter "image capture device") 1 reads the palm image, and sends the image to the computer 2-1.

The IC card reader/writer 2-4 reads and writes data from and to an IC card 5 held by the user. The IC card 5 is a well-known credit card-size card, incorporating an IC chip with memory and a CPU, and having external terminals.

The image capture device 1, IC card reader/writer 2-4, keyboard 2-2, and display 2-3 are connected to the computer 2-1, and perform the blood vessel image extraction, shape registration and other processing, described above.

The terminal 2 is connected to a server 4 via a LAN (Local Area Network) 80. The server 4 has a temporary file 4-1, and is connected to the host 7. The server 4 is also connected to a plurality of automated transaction machines (ATMs) 6 via a second LAN 82.

Such an ATM 6 can be used to perform transactions based on vein authentication. In order to use an ATM 6 to perform withdrawal transactions and other financial transactions, the user holds his hand over the image capture device 1-1 provided in the ATM 6. The image capture device 1-1 reads an image of the palm. The ATM 6 has an IC card reader/writer 60, which reads and writes data in an IC card 5 held by the user.

Further, a telephone set 6-6 for telephone communication via a call center 8 and public circuit network 9 is provided in the ATM 6. A terminal 80 connected to the host 7 is provided in the call center 8. When there is a query from a user via the telephone set 6-6 of the ATM 6, dedicated personnel at the call center 8 operate the terminal 80, and while viewing the display of the terminal 80, respond to the query of the user via the telephone set.

In this embodiment, at the time of registration the terminal 2 stores blood vessel image characteristic data 70 in the IC card 5 of the user, and stores external shape data 72 in the vein database 7-1 of the host 7. At the ATM 6, the user inserts the IC card 5 into the IC card reader/writer 60, the identification number is read, and the host 7 is notified of the identification number via the server 4. By this means the host 7 reads the external shape data from the vein database 7-1, and displays the external shape on the display of the terminal 80 at the call center 8.

Further, the IC card 5 is provided with the functions for verification processing 44 and registered blood vessel image search processing 46 of FIG. 6. Blood vessel image characteristic data at the time of verification, which is read and extracted by the image capture device 1-1 of the ATM 6, is transmitted to the IC card 5 via the IC card reader/writer 60. By means of the above-described verification processing 44 and registered blood vessel image search processing 46, the IC card 5 verifies the registered blood vessel image characteristic data against the verification blood vessel image characteristic data, and notifies the control unit 67 of the ATM 6 of the verification result.

In the event of unsuccessful verification, at the ATM 6 the user calls the dedicated personnel at the call center 8 from the telephone set 6-6 via the public circuit network 9, and queries the cause of the verification failure. The dedicated personnel at the call center 8 views the registered external shape on the terminal 80 and responds to the user. This dedicated personnel is thoroughly acquainted with the causes of verification failure, and so upon viewing the registered external shape, can provide appropriate guidance and instructions to the user.

For example, in palm authentication, a registered external shape of the hand can be viewed, and portions in which the state of image capture is different at the time of verification can be noted. That is, instructions can be given regarding that the distance between the hand and the image capture device 1-1, the spreading of the fingers, drooping of the fingers, and the positions of fingers relative to the image capture device are different from the image capture state at the time of registration. By this means, the user can obey the instructions of the dedicated personnel, altering the state of image capture, and can obtain a satisfactory verification result.

Also, the registered blood vessel image data 70 remains held in the IC card 5, and is not read by the ATM 6, so that illicit reproduction can be prevented, contributing to improved security.

Further, as explained in FIG. 11 and FIG. 12, the external shape at the time of verification is transmitted to the terminal 80 of the call center 8 from the ATM 6, via the server 4 and host 7. By this means, the external shape at the time of verification (verification shape) can be displayed, together with the external shape at the time of registration (registration shape), on the display of the terminal 80 of the call center 8. That is, as shown in FIG. 12, the external shape of the hand at the time of verification (verification shape) is displayed together with the external shape of the hand at the time of registration (registration shape).

Thus the dedicated personnel can view the external shape at the time of registration (registration shape) and the external shape at the time of verification (verification shape), and can provide appropriate guidance and instruction.

In this embodiment also, verification is performed within the IC card 5, contributing to improved security; moreover, because external shapes are not used directly in biometrics authentication, degradation of security can be prevented even when such shapes are stored on the host 7, and the burden on the IC card 5 can be alleviated.

Other Embodiments

In the above-described embodiments, contact-free biometrics authentication was explained in terms of palm vein pattern authentication; however, application to authentication of vein patterns in the back of the hand or the fingers, as well as to palmprints or other characteristics of the hand, and to fingerprints, facial features, and authentication using other body parts, is also possible. Further, the biometrics authentication system was explained as applied to automated equipment in financial businesses; but application to automated ticket issuing machines, automated vending machines, and other automated equipment in various fields, as well as to computers and to door opening/closing and other tasks involving replacement of a key which require individual authentication, is also possible.

Further, in the ATM 6 vein patterns (biometrics data) can be registered, and the media held by the user is not limited to IC cards, but may be portable telephones or other portable equipment. Further, application to biometrics authentication systems not employing media is also possible. Further, display of the registration shape and verification shape in FIG. 11 and FIG. 12 is not limited to lateral arrangement; vertical arrangement is possible, and overlapping display is also possible.

In the above, embodiments of the invention have been explained; however, various modifications can be made within the scope of the invention, and such modifications are not excluded from the scope of the invention.

By registering the shape of the body part of the user for image capture at the time of registration of data for the body part, and displaying the body part shape to the user at the time of verification, the user can directly identify the state of body part image capture at the time of registration. As a result, the user can be guided into a state of body part image capture similar to that at the time of registration, so that verification efficiency is improved. Further, even when biometrics authentication does not succeed, the body part can be guided into the circumstances of image capture at the time of registration without causing confusion on the part of the user, thus adding to the convenience to the user in biometrics authentication. Particularly when used in automated equipment, dedicated personnel may not be on site, but the user can be provided with reliable guidance, thus improving the efficiency of verification and contributing to shorten the time required for verification.

What is claimed is:

1. A biometrics system, which verifies characteristic data of a body part registered in a storage unit against characteristic data of the body part obtained through image capture to perform individual authentication, comprising:
   an image capture device which captures images of a hand of a user to be authenticated in a contact-free manner;
   the storage unit which stores characteristic data and outline shape data of the hand obtained in image capture of the image capture device at the registration;
   a control device which extracts the characteristic data and outline shape data of the hand from the captured image of the image capture device, reads, at the time of the individual biometric authentication, the outline shape data and the characteristic data of the hand from the storage unit corresponding to inputted identification number of the user and verifies the extracts the characteristic data against the characteristic data which are read from the storage unit to perform the individual authentication; and
   a display device having a display screen, which, at the time of individual authentication, displays both the outline shape of said hand which is read from the storage unit and the outline shape of the hand at the time of verification, obtained from the image capture device in parallel, adjacent and non-overlapping positions on the display screen.

2. The biometrics system according to claim 1, further comprising a biometrics data registration device, which captures an image of the hand, extracts the outline shape data of the hand and the characteristic data of the hand from the captured image, and stores the data in the storage unit.

3. The biometrics system according to claim 1, further comprising an input unit for inputting the identification number, in order to retrieve, from the storage unit, the outline shape data of the hand of the user for whom the individual authentication is to be performed.

4. The biometrics system according to claim 3, wherein the input unit is a portable unit possessed by the user.

5. The biometrics system according to claim 1, wherein the storage unit is provided in a higher-level device connected to the control device.

6. The biometrics system according to claim 1, wherein the storage unit is provided in a portable unit possessed by the user.

7. The biometrics system according to claim 1, wherein the storage unit comprises:
   a higher-level device, which is connected to the control device and stores shape data of the hand; and
   a portable unit, which is possessed by the user and stores the characteristic data of the hand.

8. The biometrics system according to claim 5, comprising:
   a communication unit of which, at the time of the individual authentication, the user to be authenticated calls a call center; and
   a terminal device which reads the outline shape of the hand of the user from the storage unit, displays the outline shape on the display unit of the call center, and provides guidance to the user.

9. The biometrics system according to claim 1, wherein the control device extracts blood vessel image data of the hand from the captured image.

10. The biometrics system according to claim 6 or claim 7, wherein the portable unit verifies the characteristic data of the hand extracted from the captured image against the characteristic data registered in the storage unit, and performs individual authentication.

11. A biometrics method for verifying body part characteristic data registered in a storage unit against body part characteristic data obtained by image capture to perform individual authentication, comprising:
   an image capture step of capturing an image, in a contact-free manner, of a hand by an image capture device;
   a step of extracting characteristic data and outline shape data of the hand from the captured image of the hand;
   a step of storing in the storage unit, at the time of registration, the outline shape data and the characteristic data of the hand obtained in the extracting step;
   an input step of inputting an identification number, in order to retrieve, from the storage unit, the outline shape data of a user for whom the individual authentication is to be performed;
   a step of reading, at the time of the biometric authentication, the outline shape data of the hand and the characteristic data of the hand from the storage unit corresponding to the inputted identification number of the user;
   an authentication step of verifying the extracted characteristic data of the hand against the characteristic data which are read from the storage unit; and
   a display step, at the time of individual authentication, of displaying on a display device having a display screen both the outline shape of the hand which is read from the storage unit and the outline shape of the hand obtained in image capture by the image capture device at the time of verification, in parallel, adjacent and non-overlapping positions on the display screen.

12. The biometrics method according to claim 11, wherein the input step comprises a step of inputting from a portable unit possessed by the user.

13. The biometrics method according to claim 11, wherein the reading step comprises a step of reading, from the storage unit provided in a higher-level device connected to a control device that performs the authentication, the outline shape data and the characteristic data at the time of registration.

14. The biometrics method according to claim 11, wherein the reading step comprises a step of reading, from the storage unit provided in a portable unit possessed by the user, the outline shape data and the characteristic data at the time of registration.

15. The biometrics method according to claim 11, wherein the reading step comprises:
- a step of reading the outline shape data from a higher-level device connected to a control device that performs the authentication; and
- a step of reading the characteristic data from a portable unit possessed by the user.

16. The biometrics system according to claim 11, further comprising:
- a step in which the user calls a call center from a communication device at the time of the individual authentication; and
- a step of reading the outline shape data of the user from the storage unit, displaying the outline shape on a display at the call center, and providing guidance to the user.

17. The biometrics method according to claim 11,
wherein the extracting step comprises a step of extracting a portion of the blood vessel image data of the hand from the captured image.

18. The biometrics method according to claim 13 or claim 14, wherein the authentication step comprises a step of verifying, by the portable unit, the characteristic data of the hand extracted from the captured body part image against the registered characteristic data in the storage unit to perform individual authentication.

* * * * *